(12) United States Patent
Liang et al.

(10) Patent No.: US 10,664,442 B1
(45) Date of Patent: May 26, 2020

(54) METHOD AND SYSTEM FOR DATA CONSISTENCY VERIFICATION IN A STORAGE SYSTEM

(71) Applicant: EMC IP Holding Company LLC, Hopkinton, MA (US)

(72) Inventors: Shuang Liang, Los Altos, CA (US); Pragyashree Gogoi, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 178 days.

(21) Appl. No.: 15/650,287

(22) Filed: Jul. 14, 2017

(51) Int. Cl.
| | | |
|---|---|---|
| G06F 16/13 | (2019.01) | |
| G06F 16/41 | (2019.01) | |
| G06F 16/18 | (2019.01) | |
| G06F 16/38 | (2019.01) | |
| G06F 16/28 | (2019.01) | |
| G06F 16/174 | (2019.01) | |
| G06F 16/27 | (2019.01) | |
| G06F 16/215 | (2019.01) | |

(52) U.S. Cl.
CPC .............. *G06F 16/13* (2019.01); *G06F 16/41* (2019.01); *G06F 16/1748* (2019.01); *G06F 16/1752* (2019.01); *G06F 16/18* (2019.01); *G06F 16/215* (2019.01); *G06F 16/27* (2019.01); *G06F 16/289* (2019.01); *G06F 16/38* (2019.01)

(58) Field of Classification Search
CPC .... G06F 3/0641; G06F 3/067; G06F 16/1748; G06F 16/10; G06F 16/178; G06F 16/27
USPC ................ 707/692, 639, 741, 758, 786, 812
See application file for complete search history.

(56) References Cited

U.S. PATENT DOCUMENTS

| | | | | |
|---|---|---|---|---|
| 7,383,378 | B1 * | 6/2008 | Rajan | G06F 3/0605 707/999.202 |
| 8,904,137 | B1 * | 12/2014 | Zhang | G06F 3/0608 711/165 |
| 9,424,285 | B1 * | 8/2016 | Condict | G06F 3/0641 |
| 2008/0005141 | A1 * | 1/2008 | Zheng | G06F 3/0608 |
| 2010/0064166 | A1 * | 3/2010 | Dubnicki | G06F 16/10 714/4.1 |
| 2010/0299490 | A1 * | 11/2010 | Attarde | G06F 11/1453 711/162 |
| 2010/0332401 | A1 * | 12/2010 | Prahlad | G06F 3/0649 705/80 |
| 2012/0158670 | A1 * | 6/2012 | Sharma | G06F 3/0608 707/692 |
| 2013/0054889 | A1 * | 2/2013 | Vaghani | G06F 3/0604 711/114 |
| 2014/0244599 | A1 * | 8/2014 | Zhang | G06F 3/0608 707/692 |

(Continued)

*Primary Examiner* — Dangelino N Gortayo
(74) *Attorney, Agent, or Firm* — Womble Bond Dickinson (US) LLP (57) ABSTRACT

According to some embodiment, a storage system provides metadata containers and an object storage that includes one or more objects. Each of the objects includes one or more data segments of a file object and each of the metadata containers includes one or more fingerprints for identifying the data segments in the object. The system loads some of the objects into a memory device of the storage system. For each of the loaded objects, the system traverses some of the metadata containers and performs a lookup operation to determine whether each data segment in the object is identified by a fingerprint from the traversed metadata containers.

18 Claims, 8 Drawing Sheets

(56) References Cited

U.S. PATENT DOCUMENTS

| | | | |
|---|---|---|---|
| 2018/0081561 A1* | 3/2018 | Todd | G06F 11/1453 |
| 2018/0246916 A1* | 8/2018 | Fathalla | G06F 3/0614 |

* cited by examiner

METHOD AND SYSTEM FOR DATA CONSISTENCY VERIFICATION IN A STORAGE SYSTEM

FIELD OF THE INVENTION

Embodiments of the present invention relate generally to data storage systems. More particularly, embodiments of the invention relate to method and system for data consistency verification in a storage system.

BACKGROUND

In a deduplicated file system, a file may be represented in a file tree having one or more levels of segments in a multi-level hierarchy. Internal nodes of the file tree include fingerprint segments. Only the lowest level nodes (e.g., L0 segments) are the actual data segments containing the actual deduplicated segments. A fingerprint may be a collision-free hash of a segment. For example, an L1 segment may include fingerprints that identify the L0 segments. Similarly, an L2 segment may include fingerprints that identify the L1 segments, and so on.

Multiple files may share a same data segment in a deduplicated file system so long as the fingerprints match. The actual data segments may be grouped and stored in a storage device, e.g., hard disk drive (HDD), as a fixed size container. The fingerprints of the data segments may also be stored in the container and indexed as a {fp, container_id} pair. The container and the index may collectively form a collection partition (CP), which is the data structure that manages the deduplicated file system.

When many expired files are accumulated within the file system, a cleaning service may be executed to remove "dead" segments. As a part of the cleaning service, to ensure data consistency between the container and the index, the service may check to ensure that all the fingerprints in the container can properly identify the data segments based on index information of the index. This, for example, may be performed by computing and comparing checksums of all the fingerprints in the container against checksums of "live" fingerprints in the index.

With the introduction of metadata separated CP, however, performing such cleaning service may pose a challenge as the fingerprints (e.g., metadata) are separately stored from the actual data segments (e.g., L0 segments), which are stored as objects.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one aspect of the invention, a log-structured container set for a metadata separated CP may be divided into two portions: metadata containers (e.g., fingerprints) and a set of objects (e.g., actual data). When performing data consistency verification of such container set, however, it cannot be guaranteed that all data segments in the objects can be identified by the fingerprints in the containers. Accordingly, it may be desirable to have an algorithm or process that loads a subset of the objects into a memory device depending on available memory space (or size), and perform a multi-pass process to check data consistency of the objects while reducing cost (e.g., latency) and optimizing system performance. Available memory space however may be impacted, for example, when a deduplicated file system is running, when a CP is disconnected for maintenance while other CPs may serve input/output (IO) workloads, and/or the system is shutdown due to data corruption and a system recovery is required. In one aspect, the storage system provides metadata containers and an object storage that includes one or more objects. Each of the objects includes one or more data segments of a file object and each of the metadata containers includes one or more fingerprints for identifying the data segments in the object. The system loads some of the objects into a memory device of the storage system. For each of the loaded objects, the system traverses some of the metadata containers and performs a lookup operation to determine whether each data segment in the object is identified by a fingerprint from the traversed metadata containers.

According to another aspect of the invention, the storage system determines a number of objects in a container set to be loaded into the memory device based on available memory size of the memory device. The container set includes the metadata containers and the object storage. Based on the number of objects, the system divides the container set into multiple ranges such that the number of objects in each range is within the available memory size. For each of the ranges, the loading of some of the objects into the memory device of the storage system includes loading of some of the objects into the memory device based on one or more container prefixes associated with one or more metadata containers within the range. The traversing of some of the metadata containers includes traversing the metadata containers within the range.

According to another aspect of the invention, the storage system traverses the metadata containers within a container range to build a data structure, where the data structure comprises one or more container prefixes associated with one or more metadata containers within the container range and a number of objects associated with each of the container prefixes. The loading of some of the objects into the memory device of the storage system includes loading some of the objects into the memory device based on the container prefixes of the data structure. The traversing of the plurality metadata containers includes traversing the metadata containers that are within the container range.

Figure 1:
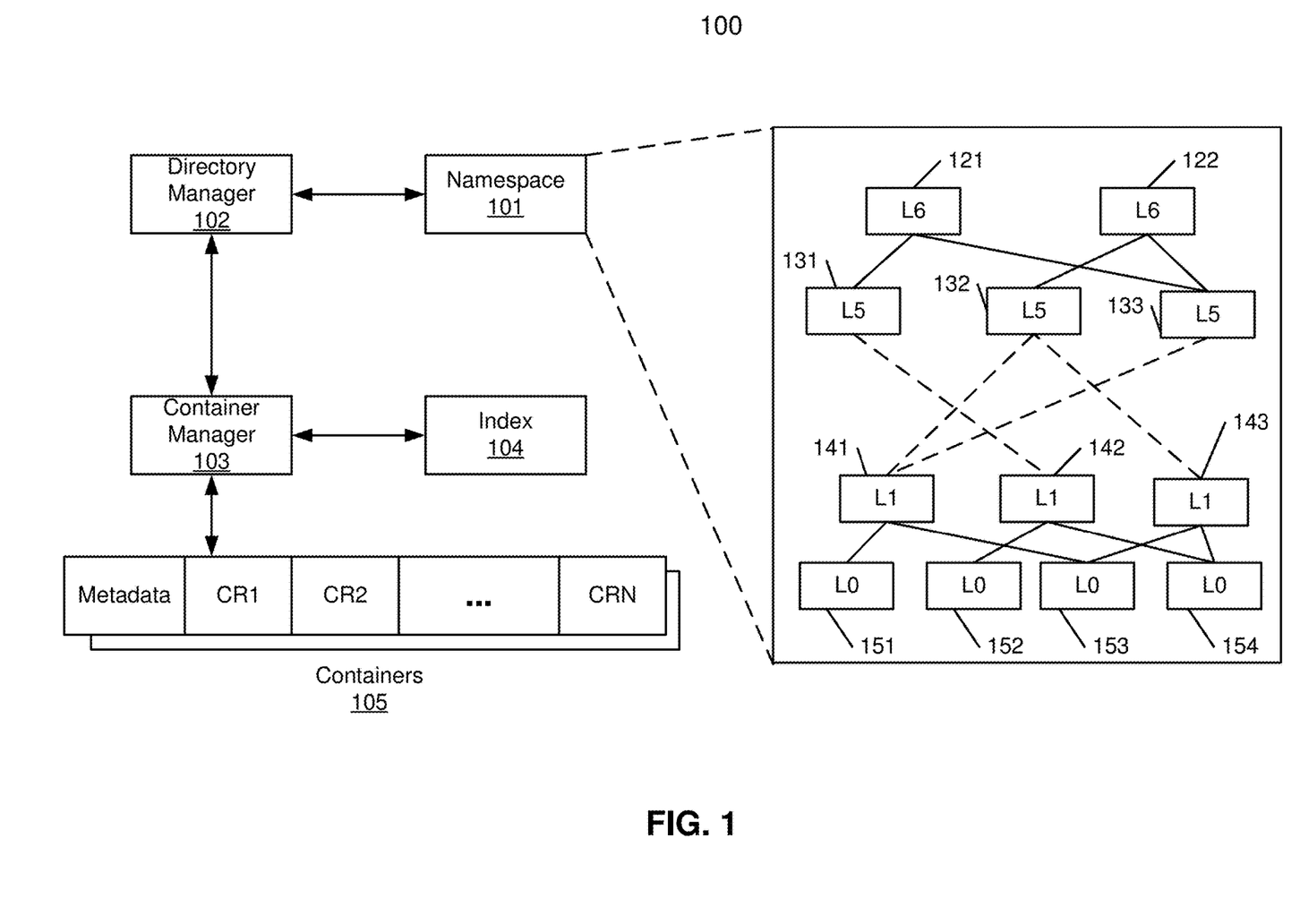
FIG. 1 is a block diagram illustrating a storage system with an example of a Merkle tree file structure according to one embodiment of the invention.

FIG. 1 is a block diagram illustrating a storage system according to one embodiment of the invention. System 100 may be implemented as part of storage system 304 of FIG. 3 (as discussed in more detail herein below). Referring to FIG. 1, system 100 traverses namespace 101 via directory manager 102, where directory manager 102 is configured to manage files stored in a file system of the storage system. In a deduplicated file system, a file may be represented in a file tree having one or more levels of segments in a multi-level hierarchy. In this example, there are seven levels L0 to L6, where L6 is the root level, also referred to as a top parent level. More or fewer levels may be applied herein. Each upper level contains one or more references to one or more lower level segments. In one embodiment, an upper level segment contains a fingerprint (e.g., metadata) of fingerprints of its child level segments. Only the lowest level segments (e.g., L0 segments) are the actual data segments containing the actual deduplicated segments. Thus, L1 to L6 are segments only contain metadata of their respective child segments(s), referred to herein as Lp segments.

In one embodiment, when system 100 traverses namespace 101 via directory manager 102, it obtains the fingerprints of the root level segments, in this example, L6 segments, as part of content handles from namespace 101. Based on the fingerprints of the current level segments, container manager 103 can identify which of the containers 105 in which the segments are stored based on indexing information from index 104. Index 104 may be maintained in the system memory (e.g., volatile memory) and/or in a storage device (e.g., non-volatile memory). Index 104 includes information mapping a fingerprint to a storage location that stores a segment represented by the fingerprint. In one embodiment, index 104 may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

Referring back to FIG. 1, in one embodiment, there are two components responsible to manage the files in the system. The first one is directory manager 102, which is a hierarchical mapping from the path to the inode representing a file. The second one is a content store, such as content store 315 of FIG. 3 discussed herein below, which manages the content of the file. Each file has a content handle (CH) that is stored in the inode that is created by content store every time the file content changes. Each CH represents a file that is abstracted as a file tree (e.g., a Merkle tree or Mtree) of segments. In this example, a file tree can have up to 7 levels: L0, . . . , L6. The L0 segments represent user data (e.g., actual data) and are the leaves of the tree. The L6 is the root of the segment tree. Segments from L1 to L6 are referred to as metadata segments or Lp segments. They represent the metadata of the file. An L1 segment is an array of L0 references. Similarly an L2 is an array of L1 references and so on. A segment is considered live if it can be referenced by any live content in the file system.

The file system packs the segments into containers 105 which are written to a disk in a log-structured manner. The log-structured container set has a log tail and a log head. New containers are always appended at the head of the log. Each container is structured into sections. The first section is the metadata section and the following sections are compression regions. A compression region is a set of compressed segments. In the metadata section all the references or fingerprints that identify the segments in the container. The metadata further includes information identifying a content type, which describes the content of the container. For instance, it describes which compression algorithm has been used, which type of segments the container has (L0, . . . , L6), etc. Container manager 103 is responsible to maintain the log-structured container set and provide a mapping from container identifiers (CID) to block offset on disk. This mapping may be maintained in memory. It also contains additional information, e.g., the content type of each container.

In the example as shown in FIG. 1, segment 121 includes a fingerprint of fingerprints of segments 131 and 133, and segment 122 includes a representation (e.g., a fingerprint) of fingerprints of segments 132-133, and so on. Some of the segments, such as segment 133, are referenced shared by multiple parent level segments (e.g., segments 121-122). Thus, segments 121-122, 131-133, and 141-143 only contain data representing the metadata of their respective child segments. Only segments 151-154 contain the actual user data.

Figure 2:
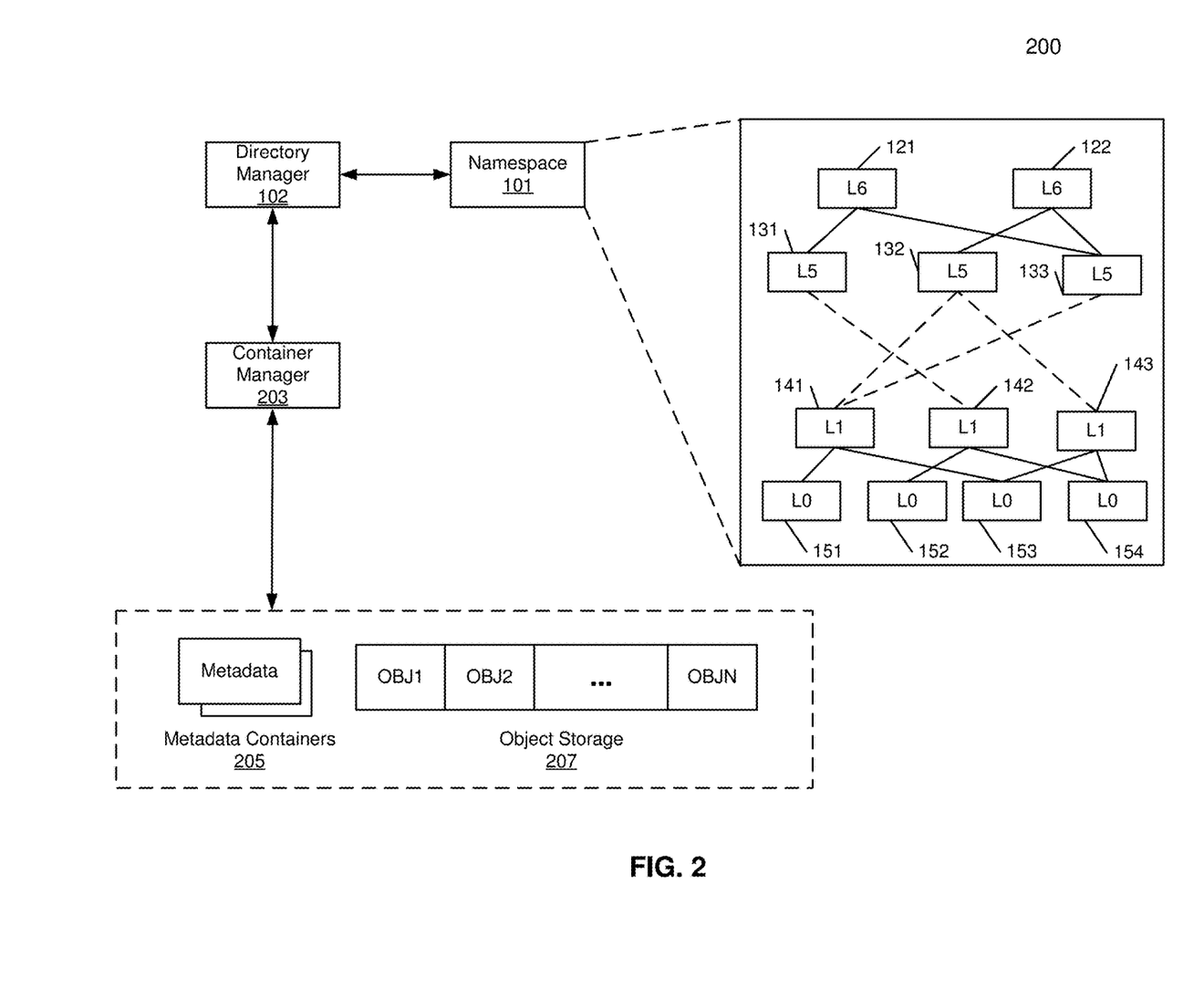
FIG. 2 is a block diagram illustrating another storage system with an example of a Merkle tree file structure according to one embodiment of the invention.

FIG. 2 is a block diagram illustrating another storage system with an example of a Merkle tree file structure according to one embodiment of the invention. System 200 may be implemented as part of storage system 304 of FIG. 3 (as discussed in more detail herein below). In FIG. 2, system 200 includes some components similar or same as system 100 of FIG. 1 (e.g., namespace 101 and directory manager 102). However, as shown in FIG. 2, the upper level segments (i.e., metadata segments) are stored in metadata containers 205 (which may be referred to as "CMETA containers"), and the L0 segments (i.e., actual data), which may be compressed, are separately managed and stored as objects in object storage 207. Each of the metadata containers 205 may include a container identifier (CID) and an object identifier (OID). The CID may include a container prefix and the OID may include a CID and a region offset. As an example, a CID may be any of the following: "001a0000", "001a0001", "001a0002", . . . , "001affff". In this example, "001a" is the container prefix. As a further example, OID may be in the following format: <container_id: region offset>, where region offset is an offset of a compression region (e.g., object) in object storage 207. Accordingly, an OID may be any of the following, for example:

Obj_id1=<001a0000: offset1>, Obj_id2=<001a0000: offset2>, Obj_idN=<001a0000: offsetN>, where N is the number of compression regions (or objects) in object storage 207. In some embodiments, object storage 207 (i.e., the objects) may be stored in a remote storage unit (e.g., in a cloud) or provided by a vendor.

In one embodiment, when system 200 traverses namespace 101 via directory manager 102, it obtains the fingerprints of the root level segments, in this example, L6 segments, as part of content handles from namespace 101. The fingerprints may point to or identify a container prefix that allows container manager 203 to identify or select which of the metadata containers 205 includes metadata segments associated with the root level segments. Using the OID in each identified metadata container, one or more desired objects (i.e., actual data) from object storage 207 may be identified by container manager 203 based on the region offset in the OID and an object size.

Metadata containers 205 and objects in object storage 207 are written to a disk in a log-structured manner. The log-structured container set has a log tail and a log head. New containers and/or objects are always appended at the head of the log, with each container and object being structured into sections. In some embodiments, the first section is the metadata section and the following sections are the object section, which may include compressed objects. In some embodiments, container manager 203 may be responsible to maintain the log-structured container set and provide a mapping from container identifiers to the objects on disk.

Figure 3:
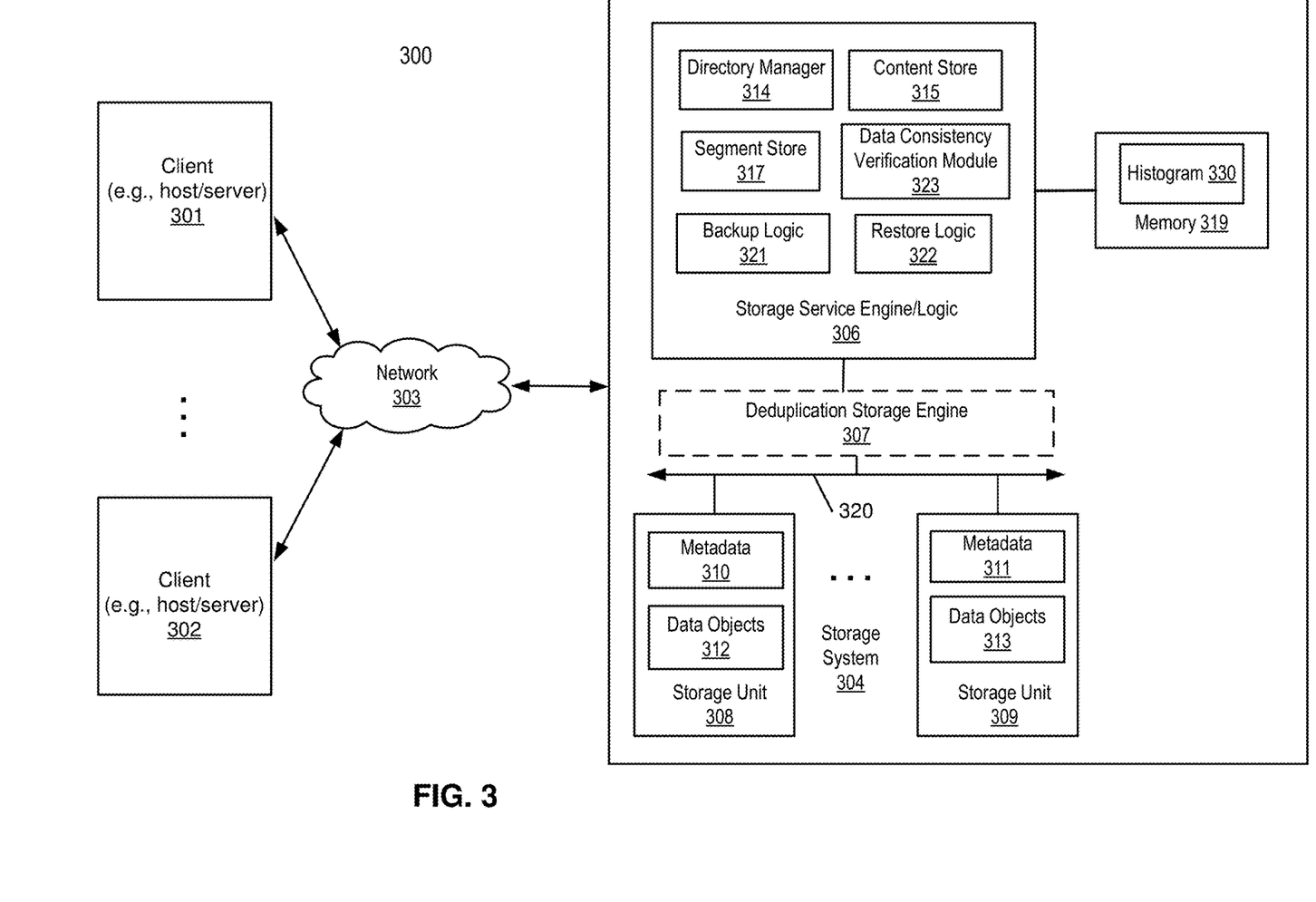
FIG. 3 is a block diagram illustrating another storage system according to one embodiment of the invention.

FIG. 3 is a block diagram illustrating another storage system according to one embodiment of the invention. Referring to FIG. 3, system 300 includes, but is not limited to, one or more client systems 301-302 communicatively coupled to storage system 304 over network 303. Clients 301-302 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 301-302 may be a primary storage system (e.g., local data center) that provides storage to other local clients, which may periodically back up the content stored therein to a backup storage system (e.g., a disaster recovery site or system), such as storage system 304. Network 303 may be any type of networks such as a local area network (LAN), a wide area network (WAN) such as the Internet, a fiber network, a storage network, or a combination thereof, wired or wireless. Clients 301-302 may be in physical proximity or may be physically remote from one another. Storage system 304 may be located in proximity to one, both, or neither of clients 301-302.

Storage system 304 may include or represent any type of servers or a cluster of one or more servers (e.g., cloud servers). For example, storage system 304 may be a storage server used for various different purposes, such as to provide multiple users or client systems with access to shared data and/or to back up (or restore) data (e.g., mission critical data). Storage system 304 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 304 may further provide storage services via an object-based protocol and Hadoop distributed file system (HDFS) protocol.

In one embodiment, storage system 304 includes, but is not limited to, storage service engine 306 (also referred to as service logic, service module, or service unit, which may be implemented in software, hardware, or a combination thereof), optional deduplication logic 307, and one or more storage units or devices 308-309 communicatively coupled to each other. Storage service engine 306 may represent any storage service related components configured or adapted to provide storage services (e.g., storage as a service) to a variety of clients using any of the access protocols set forth above. For example, storage service engine 306 may include directory manager 314, content store 315, segment store 317, data consistency verification module 323, optional backup logic 321, and optional restore logic 322. Backup logic 321 is configured to receive and back up data from a client (e.g., clients 301-302) and to store the backup data in any one or more of storage units 308-309. Restore logic 322 is configured to retrieve and restore backup data from any one or more of storage units 308-309 back to a client (e.g., clients 301-302). Directory manager 314 is configured to manage files stored in a file system of the storage system. Content store 315 may be configured to receive file segments requests from directory manager 314 and to retrieve the file segments from storage units 308-309 (via segment store 317) and/or memory 319. Segment store 317 may be configured to store and retrieve deduplicated segments to and from storage units 308-309. In another embodiment, segment store 317 includes deduplication storage engine 307 (not shown) and deduplicates file segments prior to storing the segments in storage units 308-309.

Data consistency verification module 323 may be configured to perform data consistency checking operations to determine whether there are any expired or dead segments within one or more objects (e.g., objects in object storage 207 of FIG. 2) and/or within metadata containers (e.g., metadata containers 205 of FIG. 2). If so, the data consistency verification module 323 may perform cleaning services of such segments from metadata containers 205 and/or object(s) having the segments from object storage 207. An expired or dead segment may be referred to as a data segment that is not referenced by any fingerprints (e.g., metadata) or a metadata segment that does not identify or point to any data segments.

In some embodiments, in performing the data consistency checking operations, data consistency verification module 323 may load some or all of the objects in object storage 207 into memory 319 from a list of objects, e.g., linked list, (which may be referred to as "listing") depending on available memory space (or size) of memory 319. In some embodiments, listing may reduce cost (e.g., latency) and optimize system performance as a list can search and return many desired objects in an operation. In some embodiments, the objects loaded in memory 319 may be determined based on a particular range (e.g., a container range or a predetermined range). Data consistency verification module 323 may then traverse metadata containers 205 (or a portion thereof, e.g., within a container range) and perform a lookup operation to determine whether the data segment(s) in each of the loaded objects is/are identified by the fingerprint(s) in the metadata containers 205 (or some of the metadata containers 205). For example, in some embodiments, data consistency verification module 323 may scan through metadata containers 205 (or a portion thereof) to search for specific metadata containers based on a particular container prefix. Metadata segments in each of the containers may then be used as references to determine whether the metadata segments can identify or point to the data segments in the loaded objects. Alternatively, data consistency verification module 323 may traverse through every metadata containers 205 to determine whether metadata segments in each of the containers 205 can identify the data segments in the load objects. This, however, may increase cost (e.g., operation latency) and impact system performance.

In some embodiments, in determining which of the objects in object storage 207 to load into memory 319, data consistency verification module 323 may estimate the number of objects exist in object storage 207. Assuming a uniform distribution of objects across the head and tail of the log-structured container set, data consistency verification module 323 may divide the container set into multiple ranges (e.g., container prefix ranges) such that each range may fit into available memory space in memory 319. Accordingly, data consistency verification module 323 may list the objects within each range (e.g., in storage units 308-309) and load them into memory 319 for processing or servicing. As an example, listing with a container prefix "001a" may be presented by the following (assuming the objects exist in object storage 207):

<001a0000: offset1>, <001a0000: offset2>, . . . , <001a0000: offsetN>

<001a0001: offset1>, <001a0001: offset2>, . . . , <001a0001: offsetN>

. . .

<001affff: offset1>, <001affff: offset2>, . . . , <001affff: offsetN>

In other embodiments, in determining which of the objects to load into memory 319, data consistency verification module 319 may scan or traverse through the metadata containers 205 within a specified or predetermined range (e.g., container prefix range). In doing so, data consistency verification module 319 may build a data structure, for example histogram 330 within memory 319. The histogram 330 may include entries or bins, with each entry having a container prefix and a number of objects associated with the prefix. The number of objects, for example, may be determined based on the number of compression regions (which may be obtained from OIDs) associated with each container prefix. Depending on the number of objects that can be listed and/or available memory in memory 319, data consistency verification module 323 may list the objects in storage units 308-309, and load the objects into memory 319 based on the built histogram 330 (e.g., based on each prefix in histogram 330). For instance, in some embodiments, each entry (or container prefix) in histogram 330 may be utilized to perform a listing and/or load operation. As such, in one embodiment, data consistency verification module 323 may list and load only the objects (or compression regions) associated with a specific prefix into memory 319. In some embodiments, data consistency verification module 323 may consolidate some of the entries or container prefixes (e.g., if memory space permits) in histogram 330 prior to listing and loading the objects into memory 319 such that additional objects may be listed and loaded into memory in one operation. For example, if a first prefix and a second prefix in histogram 330 is consolidated, then data consistency verification module 323 may list and load objects associated with the first prefix and objects associated with the second prefix into memory 319. This may significantly reduce cost and optimize system performance of storage system 304.

In some embodiments, data consistency verification module 323 may tag an object with a value indicating an object hit if some or all of the data segments in the object are identified by metadata segments. On the other hand, data consistency verification module 323 may tag an object with another value indicating an object miss if none of the data segments in the object is identified by a metadata segment, or at least one of the data segments is not identified. In some embodiments, if an object is untagged by data consistency verification module 323 (e.g., neither object hit nor object miss), the object may be referred to as a leaked object. Accordingly, a leaked object and/or an object tagged as a missed object may be cleaned up (or deleted) by a cleaning service to remove expired file objects. In various embodiments, data consistency verification module 323 may repeat the above-described operations until all objects in object storage 207 are serviced or verified.

In some embodiments, memory 319 may be part of system memory of storage system 304. Memory 319 may be dynamic RAM (DRAM) or non-volatile RAM (NVRAM) or a combination thereof in one embodiment. In another embodiment, memory 319 may be a persistent cache memory device (such as a solid state device (SSD) or flash memory) to accelerate performance.

Storage units 308-309 may be implemented locally (e.g., single node operating environment) or remotely (e.g., multi-node operating environment) via interconnect 320, which may be a bus and/or a network (e.g., a storage network or a network similar to network 303). Storage units 308-309 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 308-309 may be located locally or remotely accessible over a network.

In response to a data file to be stored in storage units 308-309, according to one embodiment, deduplication storage engine or deduplication logic 307 is configured to segment the data file into multiple segments (also referred to as chunks) according to a variety of segmentation policies or rules. Deduplication storage engine 307 may be implemented as part of content store 315 and/or segment store 317. Deduplication logic 307 may choose not to store a segment in a storage unit if the segment has been previously stored in the storage unit. In the event that deduplication logic 307 chooses not to store the segment in the storage unit, it stores metadata enabling the reconstruction of the file using the previously stored segment. As a result, segments of data files are stored in a deduplicated manner, either within each of storage units 308-309 or across at least some of storage units 308-309. The metadata, such as metadata 310-311, may be stored in at least some of storage units 308-309, such that files can be accessed independent of another storage unit. Metadata of each storage unit includes enough information to provide access to the files it contains.

Figure 4:
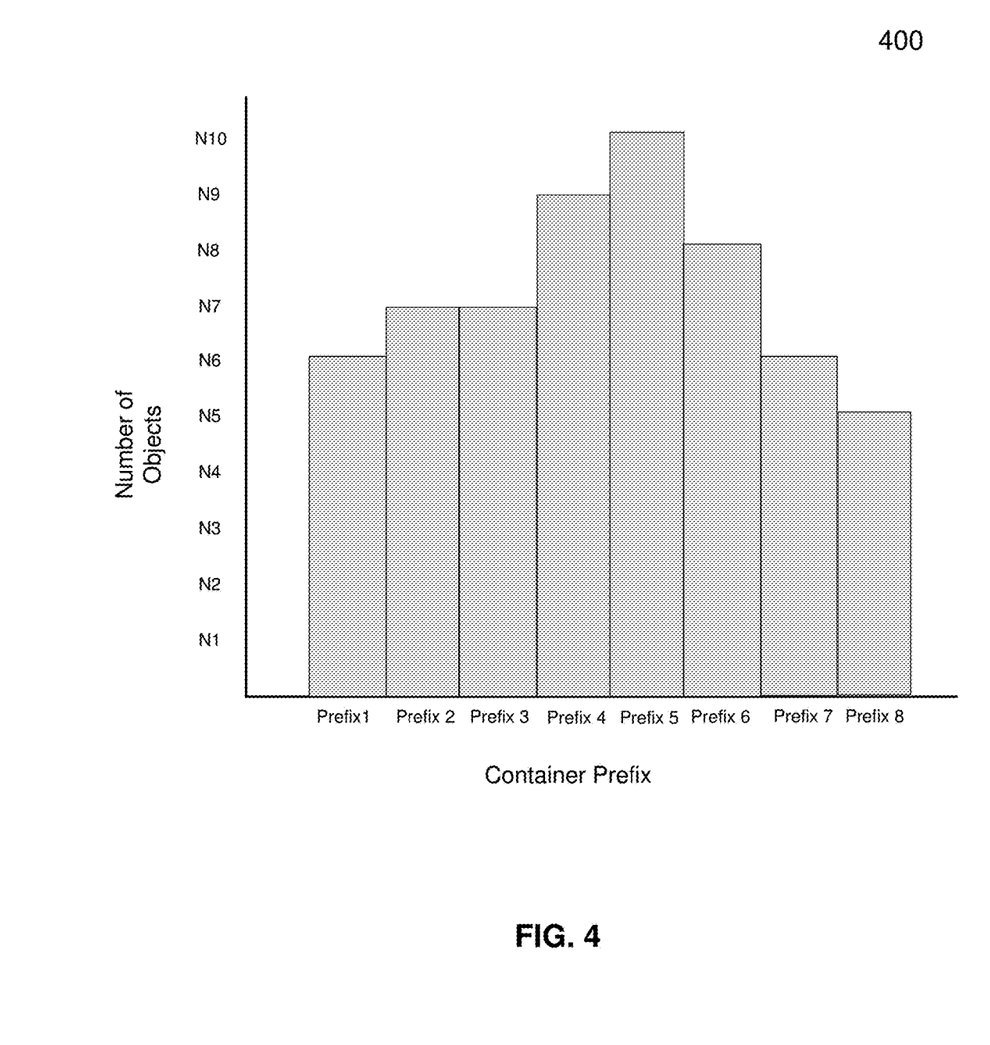
FIG. 4 is a diagram illustrating an example of a histogram according to one embodiment of the invention.

FIG. 4 is a diagram illustrating an example of a histogram according to one embodiment of the invention. In some embodiments, histogram 400 may be histogram 330 of FIG. 3. Referring to FIG. 4, histogram 400 is represented by a container prefix (x-axis) and a number of objects associated with each prefix (y-axis). In the example of FIG. 4, there are eight container prefixes (Prefix 1-Prefix 8) and a number objects with a level up to N10. For instance, in FIG. 4, there are N6 objects associated with Prefix 1, N7 objects associated with Prefix 2, N7 objects associated with Prefix 3, and so on. Generally, histogram 400 forms a uniform distribution of the number of objects across the prefixes. It should be appreciated that while FIG. 4 illustrates ten prefixes and a number of objects that is up to N10, any number of prefixes and number of objects may be included in histogram 400.

Figure 5:
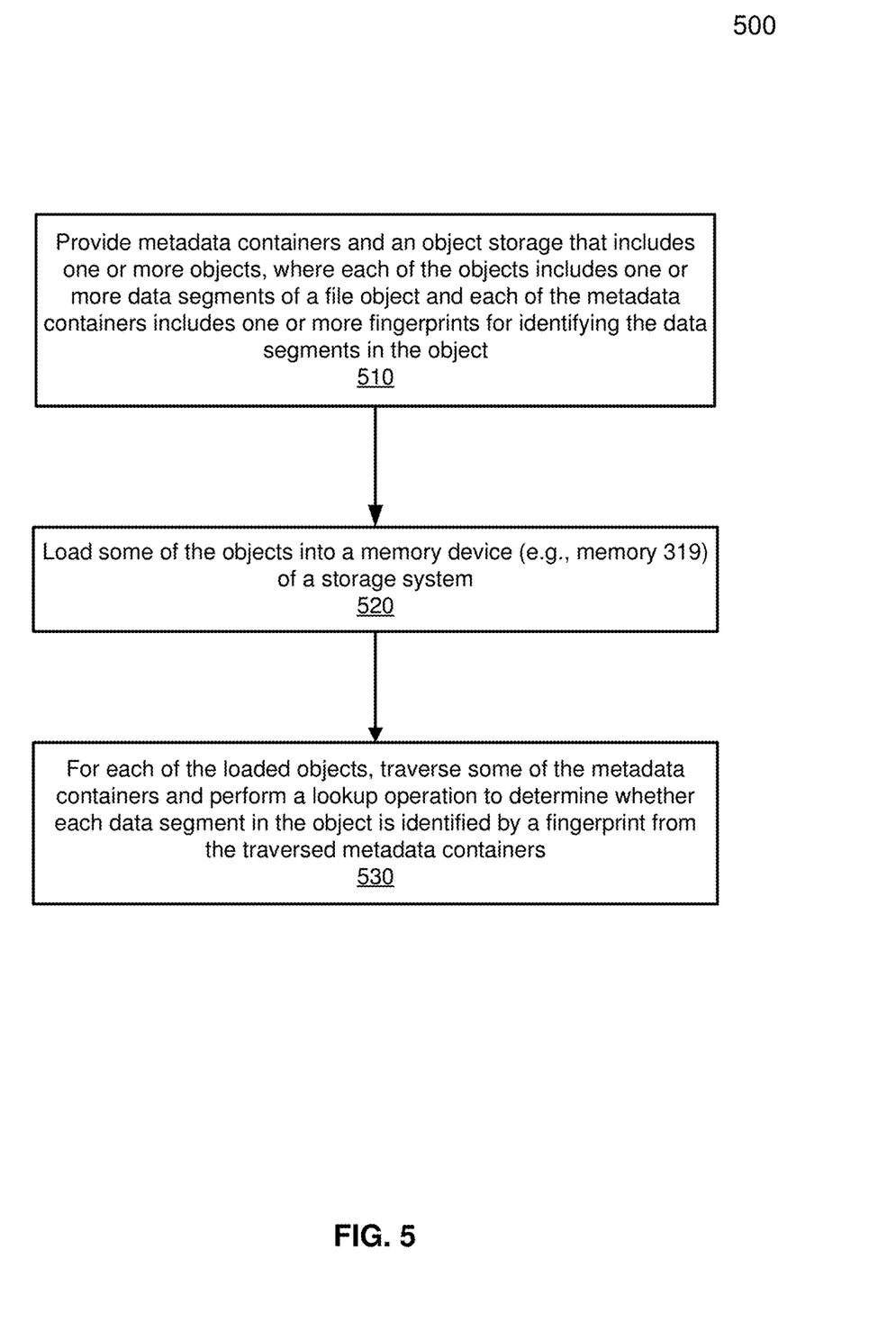
FIG. 5 is a flow diagram illustrating a method for data consistency verification according to one embodiment of the invention.

FIG. 5 is a flow diagram illustrating a method for data consistency verification according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by data consistency verification module 323 of FIG. 3.

Referring to FIG. 5, at block 510, the processing logic provides metadata containers and an object storage that includes one or more objects, where each of the objects includes one or more data segments of a file object and each of the metadata containers includes one or more fingerprints for identifying the data segments in the object. At block 520, the processing logic loads some of the objects into a memory device (e.g., memory 319) of a storage system. At block 530, for each of the loaded objects, the processing logic traverses one or more metadata containers and perform a lookup operation to determine whether each data segment in the object is identified by a fingerprint from the metadata container(s).

Figure 6:
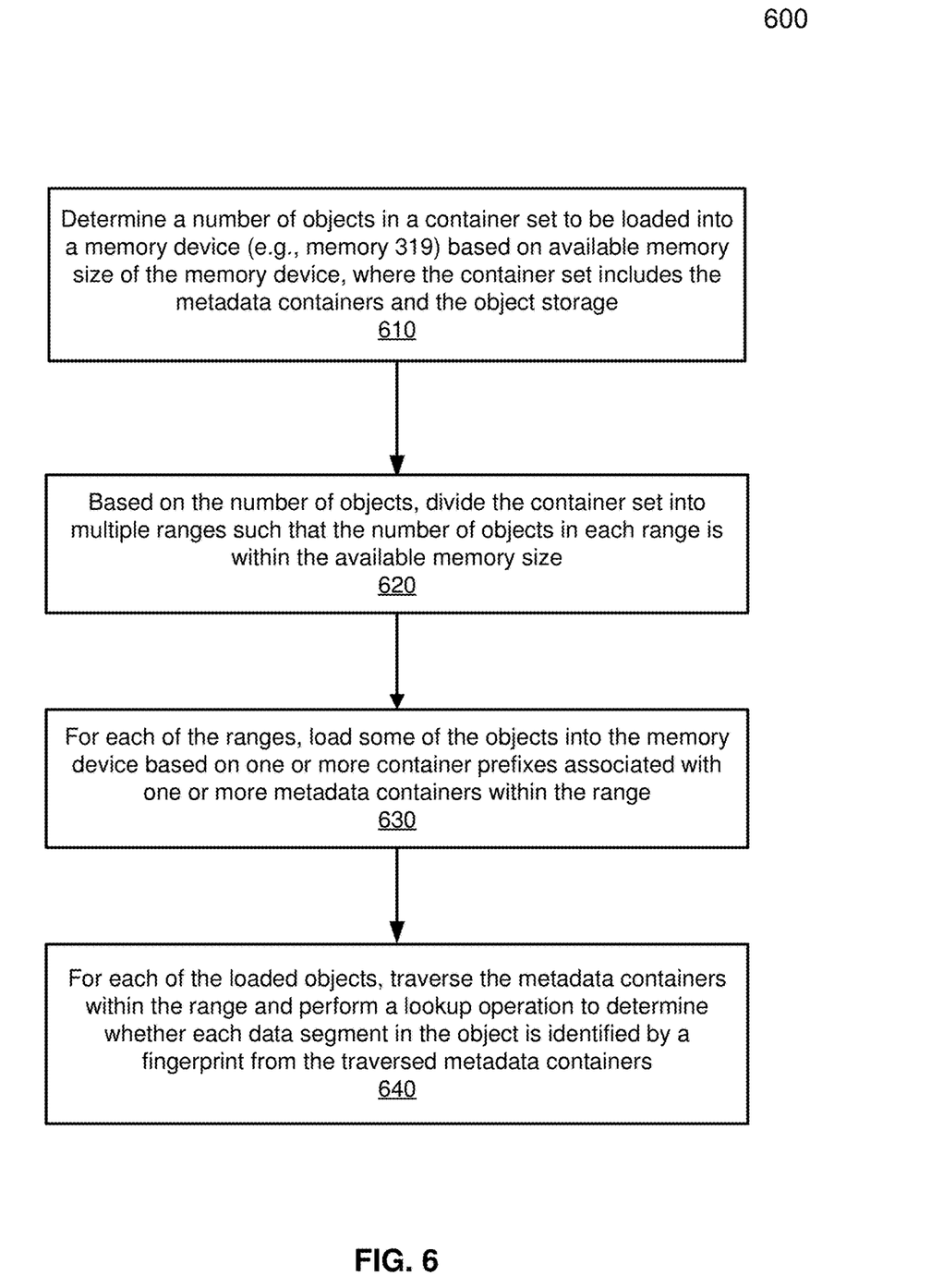
FIG. 6 is a flow diagram illustrating another method for data consistency verification according to one embodiment of the invention.

FIG. 6 is a flow diagram illustrating another method for data consistency verification according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by data consistency verification module 323 of FIG. 3.

Referring to FIG. 6, at block 610, the processing logic determines a number of objects in a container set to be loaded into the memory device based on available memory size of the memory device, where the container set includes the metadata containers and the object storage. At block 620, based on the number of objects, the processing logic divides the container set into multiple ranges such that the number of objects in each range is within the available memory size. At block 630, for each of the ranges, the processing logic loads some of the objects into the memory device based on one or more container prefixes associated with one or more metadata containers within the range. At block 640, for each of the loaded objects, the processing logic traverses the metadata containers within the range and perform a lookup operation to determine whether each data segment in the object is identified by a fingerprint from the traversed metadata containers.

Figure 7:
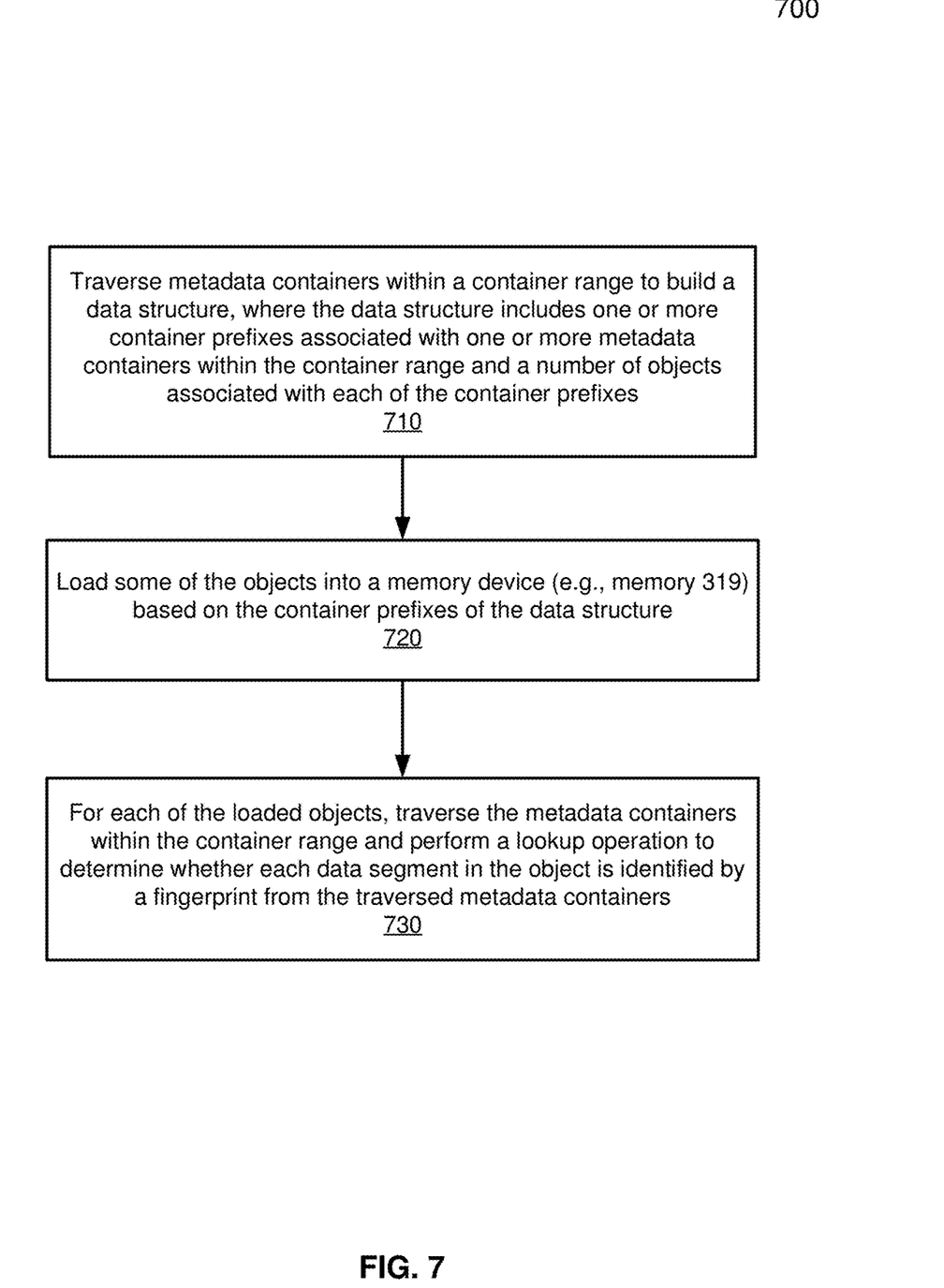
FIG. 7 is a flow diagram illustrating another method for data consistency verification according to one embodiment of the invention.

FIG. 7 is a flow diagram illustrating another method for data consistency verification according to one embodiment of the invention. Process 700 may be performed by processing logic that includes hardware (e.g. circuitry, dedicated logic, etc.), software (e.g., embodied on a non-transitory computer readable medium), or a combination thereof. For example, process 700 may be performed by data consistency verification module 323 of FIG. 3.

Referring to FIG. 7, at block 710, the processing logic traverses the metadata containers within a container range to build a data structure, where the data structure includes one or more container prefixes associated with one or more metadata containers within the container range and a number of objects associated with each of the container prefixes. At block 720, the processing logic loads some of the objects into a memory device (e.g., memory 319) based on the container prefixes of the data structure. At block 730, for each of the loaded objects, the processing logic traverses the metadata containers within the container range and perform a lookup operation to determine whether each data segment in the object is identified by a fingerprint from the traversed metadata containers.

Note that some or all of the components as shown and described above (e.g., content store 115 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
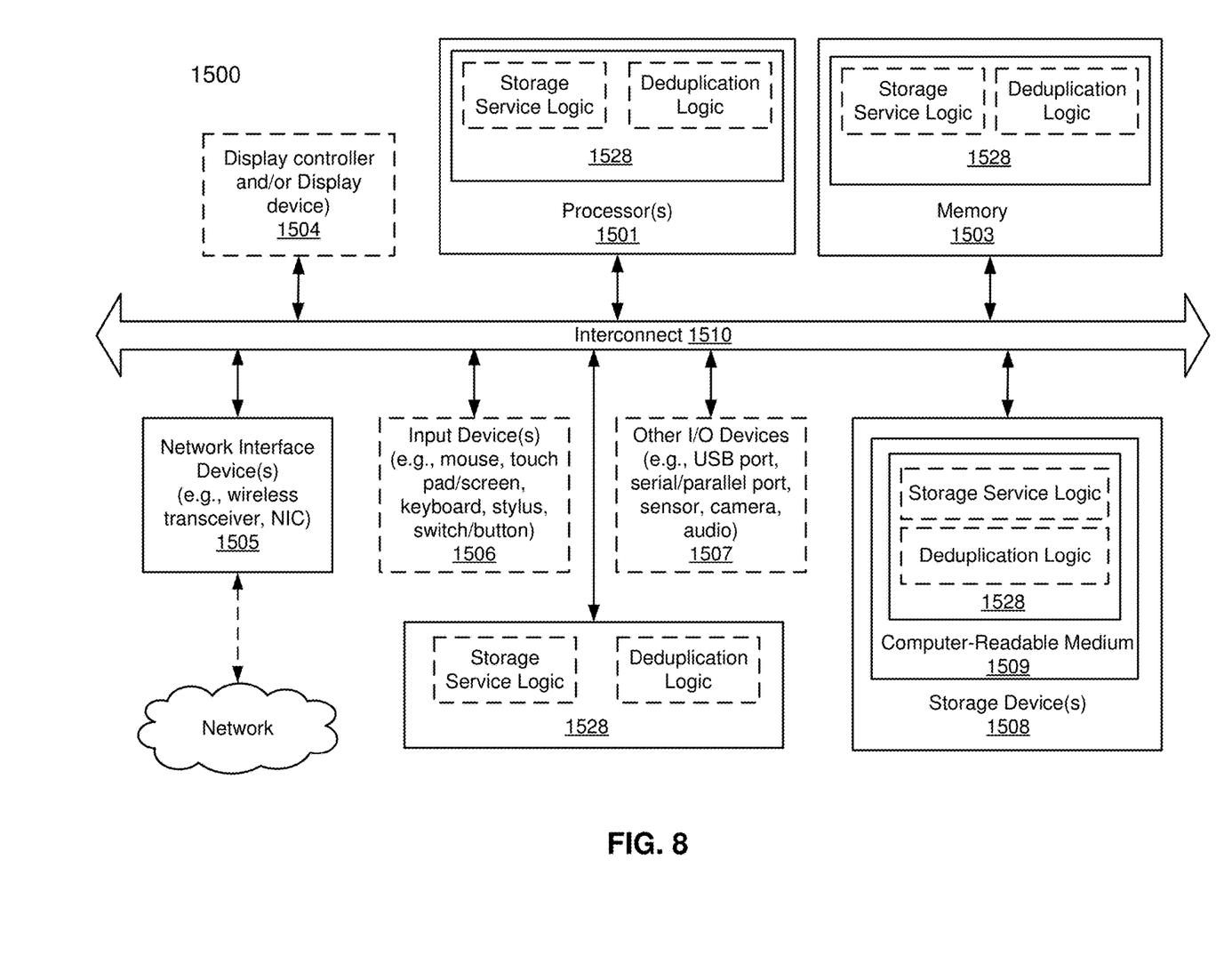
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for data consistency verification in a storage system, the method comprising:
    providing a container set including a plurality of metadata containers and an object storage, the object storage including a plurality of objects, each of the objects including one or more data segments of a file object and each of the metadata containers including one or more fingerprints for identifying the data segments in the object;
    dividing the metadata containers in the container set into a plurality of ranges such that one or more objects in each range fit into an available memory in a memory device;
    loading the one or more objects in each of the plurality of ranges of metadata containers into the available memory of the memory device, wherein each of the one or more loaded objects corresponds to a compression region and is associated with a specific prefix of one of the metadata container in the range; and
    for each of the loaded objects in the range of metadata containers,
        traversing the metadata containers in the range and performing a lookup operation on the metadata containers to determine whether each data segment in the object is identified by a fingerprint from the traversed metadata containers,
        tagging the object with a first value indicative of an object hit in response to determining that all data segments in the object are identified, and
        tagging the object with a second value indicative of an object miss in response to determining that at least one data segment in the object is not identified.

2. The method of claim 1,
wherein the number of metadata containers in each range is determined based on a number of objects in the container set to be loaded into the memory device based on a size of available memory size of the memory device; and
for each of the ranges,
    wherein loading the objects in the range into the memory device of the storage system comprises loading the objects into the memory device based on one or more container prefixes associated with one or more metadata containers within the range.

3. The method of claim 1, further comprising:
traversing the metadata containers within a container range to build a data structure, wherein the data structure comprises one or more container prefixes associated with the metadata containers within the container range and a number of objects associated with each of the container prefixes;
    wherein loading the objects in each range into the memory device of the storage system comprises loading the objects into the memory device based on the container prefixes of the data structure;
wherein traversing the metadata containers in each range comprises traversing the metadata containers that are within the container range.

4. The method of claim 3, further comprising:
prior to loading the objects in each range into the memory device of the storage system, consolidating a first of the container prefixes with a second of the container prefixes to form consolidated container prefixes;
wherein loading the objects into the memory device based on the container prefixes comprises loading the objects into the memory device based on the consolidated container prefixes.

5. The method of claim 3, wherein prior to loading the objects into the memory device of the storage system, listing the objects in a storage unit based on the container prefixes.

6. The method of claim 1, wherein the object is a leaked object if the object is untagged.

7. A non-transitory machine-readable medium having instructions stored therein, which when executed by a processor, cause the processor to perform operations for, the operations comprising:
providing a container set including a plurality of metadata containers and an object storage, the object storage including a plurality of objects, each of the objects including one or more data segments of a file object and each of the metadata containers including one or more fingerprints for identifying the data segments in the object;
dividing the metadata containers in the container set into a plurality of ranges such that one or more objects in each range fit into an available memory in a memory device;
loading the one or more objects in each of the plurality of ranges of metadata containers into the available memory of the memory device, wherein each of the one or more loaded objects corresponds to a compression region and is associated with a specific prefix of one of the metadata container in the range; and
for each of the loaded objects in the range of metadata containers,
traversing the metadata containers in the range and performing a lookup operation on the metadata containers to determine whether each data segment in the object is identified by a fingerprint from the traversed metadata containers,
tagging the object with a first value indicative of an object hit in response to determining that all data segments in the object are identified, and
tagging the object with a second value indicative of an object miss in response to determining that at least one data segment in the object is not identified.

8. The non-transitory machine-readable medium of claim 7,
wherein the number of metadata containers in each range is determined based on a number of objects in the container set to be loaded into the memory device based on a size of available memory size of the memory device; and
for each of the ranges,
wherein loading the objects in the range into the memory device of the storage system comprises loading the objects into the memory device based on one or more container prefixes associated with one or more metadata containers within the range.

9. The non-transitory machine-readable medium of claim 7, wherein the operations further comprise:
traversing the metadata containers within a container range to build a data structure, wherein the data structure comprises one or more container prefixes associated with the metadata containers within the container range and a number of objects associated with each of the container prefixes;
wherein loading the objects in each range into the memory device of the storage system comprises loading the objects into the memory device based on the container prefixes of the data structure;
wherein traversing the metadata containers in each range comprises traversing the metadata containers that are within the container range.

10. The non-transitory machine-readable medium of claim 9, wherein the operations further comprise:
prior to loading the objects in each range into the memory device of the storage system, consolidating a first of the container prefixes with a second of the container prefixes to form consolidated container prefixes;
wherein loading the objects into the memory device based on the container prefixes comprises loading the objects into the memory device based on the consolidated container prefixes.

11. The non-transitory machine-readable medium of claim 9, wherein the object is a leaked object if the object is untagged.

12. The non-transitory machine-readable medium of claim 9, wherein prior to loading the objects into the memory device of the storage system, listing the objects in a storage unit based on the container prefixes.

13. A data processing system, comprising:
a processor; and
a memory coupled to the processor to store instructions, which when executed by the processor, cause the processor to perform operations, the operations comprising:
providing a container set including a plurality of metadata containers and an object storage, the object storage including a plurality of objects, each of the objects including one or more data segments of a file object and each of the metadata containers including one or more fingerprints for identifying the data segments in the object;
dividing the metadata containers in the container set into a plurality of ranges such that one or more objects in each range fit into an available memory in a memory device;
loading the one or more objects in each of the plurality of ranges of metadata containers into the available memory of the memory device, wherein each of the one or more loaded objects corresponds to a compression region and is associated with a specific prefix of one of the metadata container in the range; and
for each of the loaded objects in the range of metadata containers,
traversing the metadata containers in the range and performing a lookup operation on the metadata containers to determine whether each data segment in the object is identified by a fingerprint from the traversed metadata containers,
tagging the object with a first value indicative of an object hit in response to determining that all data segments in the object are identified, and tagging the object with a second value indicative of an object miss in response to determining that at least one data segment in the object is not identified.

14. The data processing system of claim 13,
wherein the number of metadata containers in each range is determined based on a number of objects in the container set to be loaded into the memory device based on a size of available memory size of the memory device; and for each of the ranges,
wherein loading the objects in the range into the memory device of the storage system comprises loading the objects into the memory device based on one or more container prefixes associated with one or more metadata containers within the range.

15. The data processing system of claim 13, wherein the operations further comprise:
traversing the metadata containers within a container range to build a data structure, wherein the data structure comprises one or more container prefixes associated with the metadata containers within the container range and a number of objects associated with each of the container prefixes;

wherein loading the objects in each range into the memory device of the storage system comprises loading the objects into the memory device based on the container prefixes of the data structure;

wherein traversing the metadata containers in each range comprises traversing the metadata containers that are within the container range.

16. The data processing system of claim 15, wherein the operations further comprise:
prior to loading the objects in each range into the memory device of the storage system, consolidating a first of the container prefixes with a second of the container prefixes to form consolidated container prefixes;

wherein loading the objects into the memory device based on the container prefixes comprises loading the objects into the memory device based on the consolidated container prefixes.

17. The data processing system of claim 13, wherein the object is a leaked object if the object is untagged.

18. The data processing system of claim 13, wherein prior to loading the objects into the memory device of the storage system, listing the objects in a storage unit based on the container prefixes.

* * * * *